US012763503B2

(12) United States Patent
Lee et al.

(10) Patent No.: US 12,763,503 B2
(45) Date of Patent: Oct. 13, 2026

(54) CABLE ASSEMBLY INCLUDING PRINTED CIRCUIT BOARD

(71) Applicant: 3M INNOVATIVE PROPERTIES COMPANY, St. Paul, MN (US)

(72) Inventors: Kok Hoe Lee, Geylang (KR); Saujit Bandhu, Sengkang (KR); YunLong Qiao, Bukit Timah (KR)

(73) Assignee: 3M Innovative Properties Company, St. Paul, MN (US)

( * ) Notice: Subject to any disclaimer, the term of this patent is extended or adjusted under 35 U.S.C. 154(b) by 421 days.

(21) Appl. No.: 18/278,922

(22) PCT Filed: Feb. 15, 2022

(86) PCT No.: PCT/IB2022/051346
§ 371 (c)(1),
(2) Date: Aug. 25, 2023

(87) PCT Pub. No.: WO2022/185138
PCT Pub. Date: Sep. 9, 2022

(65) Prior Publication Data

US 2024/0297450 A1 Sep. 5, 2024

Related U.S. Application Data

(60) Provisional application No. 63/157,200, filed on Mar. 5, 2021.

(51) Int. Cl.
*H01R 12/71* (2011.01)
*H01R 12/70* (2011.01)
(Continued)

(52) U.S. Cl.
CPC ....... *H01R 12/714* (2013.01); *H01R 12/7047* (2013.01); *H01R 12/79* (2013.01); *H01R 13/6658* (2013.01)

(58) Field of Classification Search
CPC .. H01R 12/714; H01R 12/7047; H01R 12/79; H01R 13/6658; H01R 12/718; H01R 12/771
See application file for complete search history.

(56) References Cited

U.S. PATENT DOCUMENTS 6,830,460 B1 12/2004 Rathburn
10,535,939 B1 * 1/2020 Qiao ...................... H01R 12/62
(Continued)

FOREIGN PATENT DOCUMENTS

WO 2018060922 A1 4/2018

OTHER PUBLICATIONS

International Search Report for PCT International Application No. PCT/IB2022/051346, mailed on May 27, 2022, 3 pages.

*Primary Examiner* — Joseph Ortega
(74) *Attorney, Agent, or Firm* — Jonathan L. Tolstedt

(57) ABSTRACT

A cable assembly is disclosed and includes a plurality of cables, a plurality of terminals, a printed circuit board (PCB), a plurality of cable contact pads defined on the PCB, and a plurality of terminal contact pads defined on the PCB. A first terminal contact pad and a first cable contact pad are in electrical communication with one another and a second terminal contact pad and a second cable contact pad are in electrical communication. The first cable contact pad and the first terminal contact pad are disposed at different locations on the PCB, as measured along a Y axis, and the second cable contact pad and the second terminal contact pad are disposed at different locations on the PCB, as measured along the Y axis.

13 Claims, 7 Drawing Sheets

(51) Int. Cl.
*H01R 12/79* (2011.01)
*H01R 13/66* (2006.01)

(56) References Cited

U.S. PATENT DOCUMENTS

| | | | |
|---|---|---|---|
| 2015/0044911 | A1 | 2/2015 | Wu et al. |
| 2015/0214666 | A1* | 7/2015 | Schumacher ...... H01R 13/6477 29/846 |
| 2020/0259281 | A1 | 8/2020 | Kim |
| 2020/0395716 | A1 | 12/2020 | Kim et al. |

* cited by examiner

CABLE ASSEMBLY INCLUDING PRINTED CIRCUIT BOARD

CROSS REFERENCE TO RELATED APPLICATIONS

This application is a national stage filing under 35 U.S.C. 371 of PCT/IB2022/051346, filed Feb. 15, 2022, which claims the benefit of U.S. Provisional Application No. 63/157,200, filed Mar. 5, 2021, the disclosures of which are incorporated by reference in their entireties herein.

TECHNICAL FIELD

This application relates to electrical connectors and cable assemblies.

BACKGROUND

Electrical connectors are electro-mechanical devices typically including a mechanical housing supporting and/or partially enclosing electrical terminals. Electrical connectors are frequently used to electrically interconnect two or more electronic components. Some electrical connectors provide electrical interconnection between an electrical cable assembly including one or more electrical wires, one or more a printed circuit boards (PCB) and/or electrical terminals. In some examples, a wire-to-board interconnect includes a connector pair comprising a plug connector and a receptacle connector in the mated position.

BRIEF SUMMARY

In some aspects of the present disclosure, a cable assembly is disclosed. The cable assembly can include a plurality of cables, a cable contact end defined at one end of each of the cables, a plurality of terminals, a terminal PCB contact end defined at one end of each of the terminals, a printed circuit board (PCB), a plurality of cable contact pads defined on the PCB, and a plurality of terminal contact pads defined on the PCB. A first terminal contact pad of the plurality of terminal contact pads and a first cable contact pad of the plurality of cable contact pads can be in electrical communication with one another and a second terminal contact pad of the plurality of terminal contact pads and a second cable contact pad of the plurality of cable contact pads can be in electrical communication with one another. A first cable contact end of the plurality of cable contact ends can be in electrical communication with the first cable contact pad and a second cable contact end of the plurality of cable contact ends can be in electrical communication with the second cable contact pad. A first terminal PCB contact end of the plurality of terminal PCB contact ends can be in electrical communication with the first terminal contact pad and a second terminal PCB contact end of the plurality of terminal PCB contact ends can be in electrical communication with the second terminal contact pad. The first cable contact pad and the first terminal contact pad can be disposed at different locations on the PCB, as measured along a Y axis, and the second cable contact pad and the second terminal contact pad can be disposed at different locations on the PCB, as measured along the Y axis.

In some aspects of the present disclosure, a cable assembly is disclosed. The cable assembly can include a plurality of cables, a cable contact end defined at one end of each of the cables, a plurality of terminals, a terminal PCB contact end defined at one end of each of the terminals, a printed circuit board (PCB), a plurality of cable contact pads defined on the PCB, and a plurality of terminal contact pads defined on the PCB. A first terminal contact pad of the plurality of terminal contact pads and a first cable contact pad of the plurality of cable contact pads can be in electrical communication with one another and a second terminal contact pad of the plurality of terminal contact pads and a second cable contact pad of the plurality of cable contact pads can be in electrical communication with one another. A first cable contact end of the plurality of cable contact ends can be in electrical communication with the first cable contact pad and a second cable contact end of the plurality of cable contact ends can be in electrical communication with the second cable contact pad. A first terminal PCB contact end of the plurality of terminal PCB contact ends can be in electrical communication with the first terminal contact pad and a second terminal PCB contact end of the plurality of terminal PCB contact ends can be in electrical communication with the second terminal contact pad. The first cable contact pad and the first terminal contact pad can be disposed at different locations on the PCB, as measured along a Y axis, and the second cable contact pad and the second terminal contact pad can be disposed at substantially the same location on the PCB, as measured along the Y axis.

In some aspects of the present disclosure, a cable assembly is disclosed. The cable assembly can include a cable, a cable contact end defined at one end of the cable, a terminal, a terminal PCB contact end defined at one end of the terminal, a printed circuit board (PCB), a cable contact pad defined on the PCB, and a terminal contact pad defined on the PCB. The terminal contact pad and the cable contact pad can be in electrical communication with one another, the cable contact end can be in electrical communication with the cable contact pad and the terminal PCB contact end can be in electrical communication with the terminal contact pad. The terminal contact pad and the cable contact pad can be disposed at different locations on the PCB, as measured along a Y axis.

DETAILED DESCRIPTION OF ILLUSTRATIVE EMBODIMENTS

Figure 1:
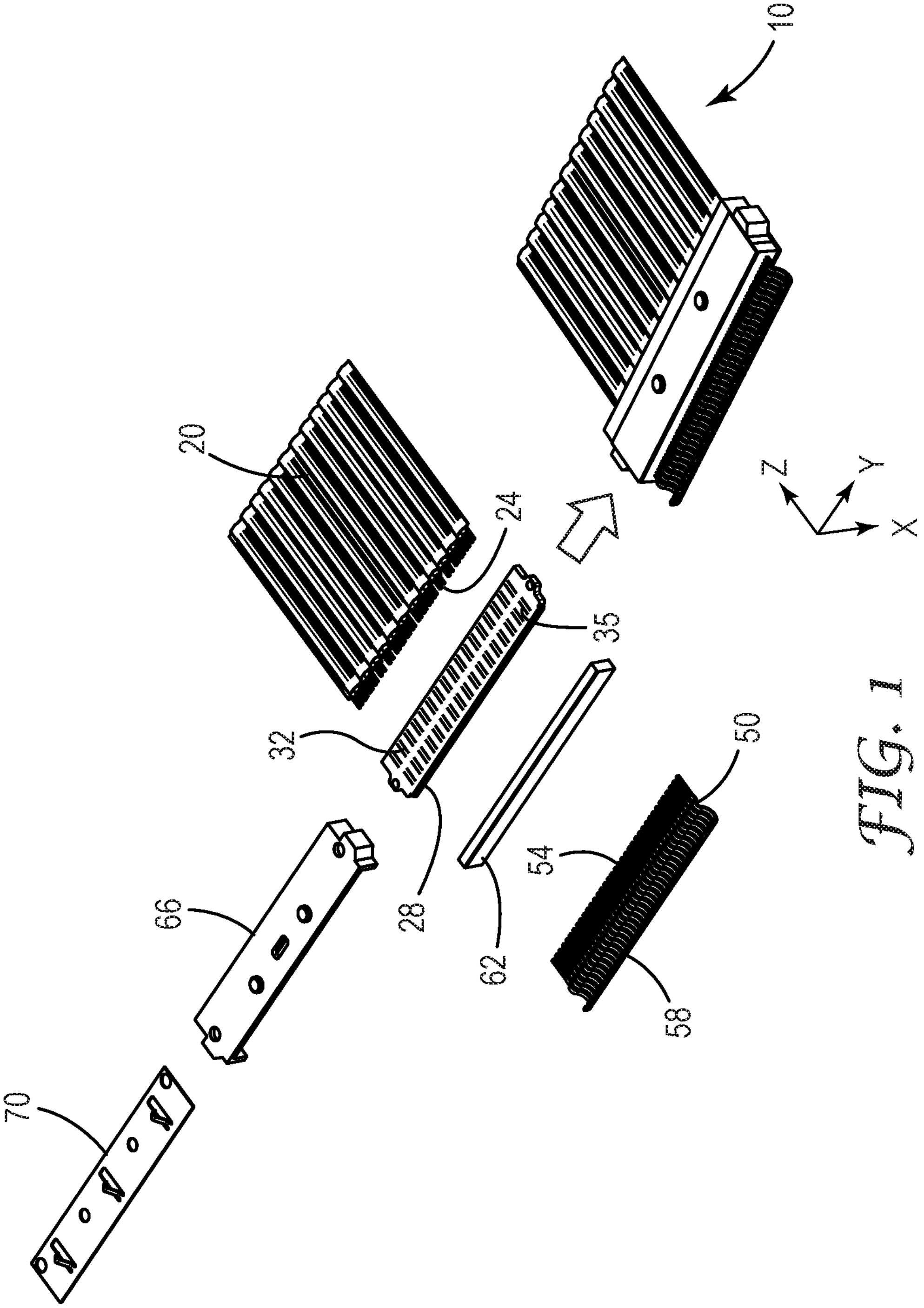
FIG. 1 is an exploded perspective view of a cable assembly according to exemplary embodiments of the present disclosure.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open-ended sense, and generally mean "including, but not limited to." It will be understood that the terms "consisting of" and "consisting essentially of" are subsumed in the term "comprising," and the like.

Figure 2:
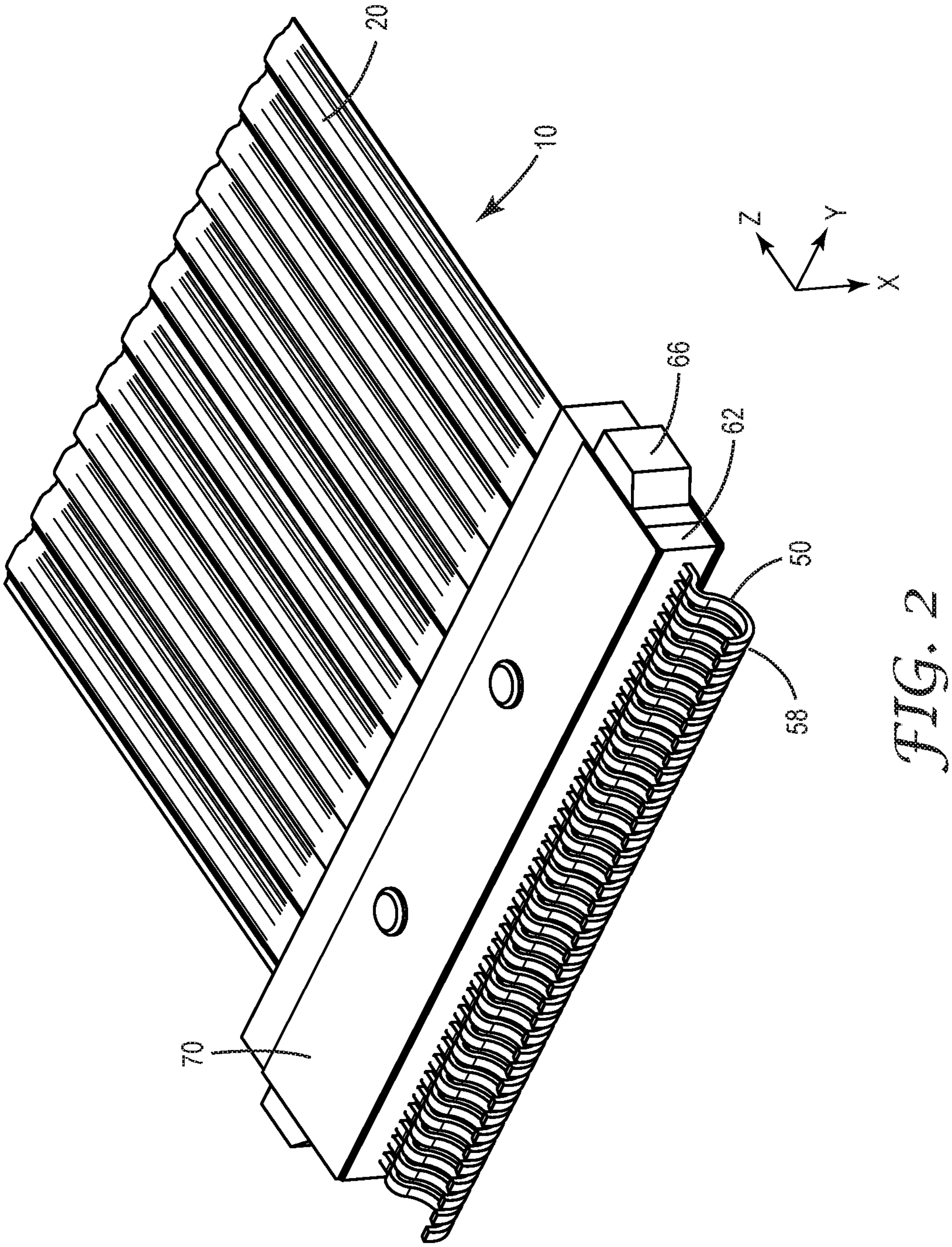
FIG. 2 is a perspective view of a cable assembly according to exemplary embodiments of the present disclosure.

Turning to the figures, FIG. 1 is an exploded perspective view of a cable assembly according to exemplary embodiments of the present disclosure and FIG. 2 is a perspective view of a cable assembly according to exemplary embodiments of the present disclosure. The cable assembly 10 can include one or more cables 20, a Printed Circuit Board (PCB) 28, one or more terminals 50, a first frame 62, a second frame 66 and a ground plate 70. As can be seen in the figures, an X axis can be orthogonal to a Y axis, and each of the X axis and the Y axis can be orthogonal to a Z axis. For clarity, moving upwardly along the Z axis can indicate moving upward and to the right in FIG. 1, or from the terminals towards the cables, while moving downwardly along the Z axis can indicate the opposite direction. Moving from the upper left to the lower right along the row of terminals, along the PCB, or along the row of cables in FIG. 1 (or moving towards the right in FIG. 3) can indicate moving forwardly along the Y axis, whereas moving in the opposite direction can indicate moving rearwardly along the Y axis.

The cable 20 (or one or more cables of a plurality of cables) can include a cable contact end 24 which can be disposed at one end of the cable 20. In some embodiments, the cable contact end 24 is at a lower, or lowest, part of the cable 20 as measured along the Z axis. The cable contact end 24 can include an electrically conductive material, such as copper or another metal or metal alloy. As is common in the art, the cable 20 can include a conductive material surrounded by a substantially non-conductive housing.

The terminal 50 (or one or more terminals of a plurality of terminals) can include a terminal PCB contact end 54, which can be disposed at one end of the terminal 50, and a terminal base circuit board contact end 58, which can be disposed at an opposed end of the terminal 50 as will be described below in further detail. In some embodiments, the terminal PCB contact end contact end 54 is disposed at an upper, or uppermost, part of the terminal 50 as measured along the Z axis. In some embodiments, the terminal base circuit board contact end 58 is disposed at a lower, or lowest, part of the terminal 50 as measured along the Z axis. Each of the terminal base circuit board contact end 58 and the terminal PCB contact end 54 can include an electrically conductive material, such as copper or another metal or metal alloy. The terminal 50 can also include an electrically conductive material, such as copper or another metal or metal alloy, to facilitate electrical communication and conductivity between the terminal PCB contact end 54 and the terminal base circuit board contact end 58.

The PCB 28 can be disposed between (geometrically and/or along a path of electrical communication) the cables 20 and/or the cable contact ends 24 and the terminals 50 and/or the terminal PCB contact ends 54. The PCB 28 can include one or more cable contact pads 32 and one or more terminal contact pads 35. Each of the cable contact pads 32 and terminal contact pads 35 can include an electrically conductive material, such as copper or another metal or metal alloy. One or more traces 38 can be formed on the PCB and each trace 38 can include an electrically conductive material or metal. A trace 38 can electrically connect a cable contact pad 32 with a terminal contact pad 35 by contacting each pad and allowing the pads (32, 35) to electrically communicate. In some embodiments, more than two pads (32, 35) can be connected by a single trace and/or more than one trace can connect two pads (32, 35).

The cable assembly 10 can include a first frame 62 and second frame 66. One or both of the first frame 62 and the second frame 66 can provide structural support for various elements of the cable assembly 10 or can facilitate a secure connection between elements of the cable assembly. In some examples, the first frame 62 can secure, encapsulate or partially encapsulate all or a portion of the terminals 50, PCB 28, terminal contact pads 35 and/or the terminal PCB contact ends 54. The first frame 62 can protect and shield these elements (28, 35, 50, 54) and facilitate and protect the electrical connection between the terminal PCB contact ends 54 and the terminal contact pads 35.

In some embodiments, the second frame 66 can secure, encapsulate or partially encapsulate all or a portion of the terminals 50, PCB 28, terminal contact pads 35, cable contact pads 32, cable contact ends 24 and/or the terminal PCB contact ends 54. The second frame 66 can protect and shield these elements (24, 28, 32, 35, 50, 54) and facilitate and protect the electrical connection between the terminal PCB contact ends 54 and the terminal contact pads 35 and/or the electrical connection between the cable contact ends 24 and the cable contact pads 32. The first frame 62 and/or the second frame 66 can include, or can be made from, a polymer or a plastic such as Polybutylene Terephthalate (PBT) and/or Liquid Crystal Polymer (LCP).

A ground plate 70 can be included with the cable assembly 10. The ground plate 70 can be adjacent, proximate or in contact with one or more of the first frame 62, second frame 66, PCB 28 and the terminals 50. The ground plate 70 will be described below in further detail, in reference to a connector system 100.

In an exemplary cable assembly, such as that shown in FIG. 2, each of the ground plate 70, the second frame 66 and the first frame 62 can be disposed along the Y direction, or can have their longest side oriented along the Y direction. Further, any of the first frame 62, second frame 66, PCB 28, and ground plate 70 can be structurally connected to or adjacent one another to enhance the structural properties of the cable assembly 10 and its constituent elements. Further, any of the first frame 62, second frame 66, and ground plate 70 can encapsulate, partially encapsulate and/or be structurally adjacent any one of the terminals 50, terminal contact pads 35, cable contact pads 32, cables 20, cable contact ends 24, and the terminal PCB contact ends 54.

Figure 3:
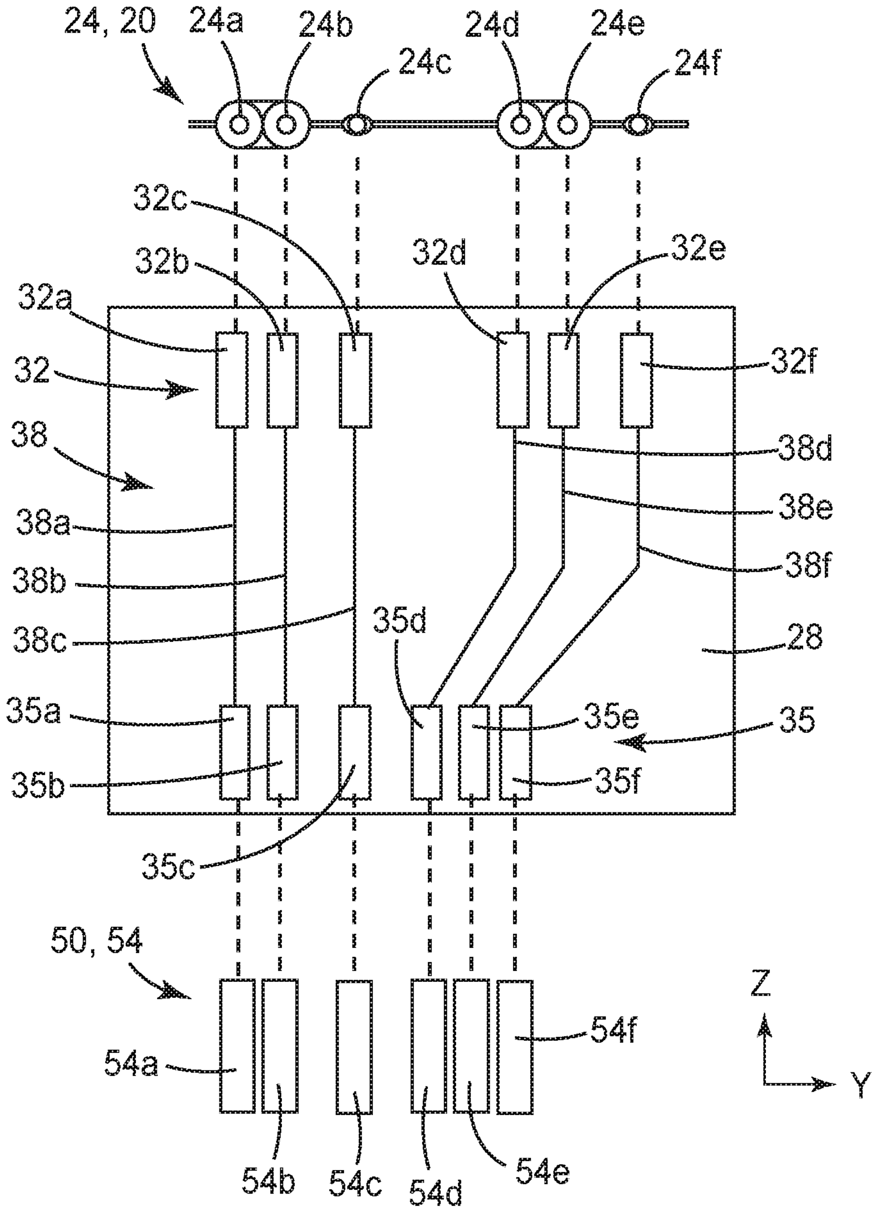
FIG. 3 is a schematic view of a printed circuit board (PCB), cable contact ends and terminal PCB contact ends according to exemplary embodiments of the present disclosure.

Turning specifically to FIG. 3, the PCB 28, cable contact pads 32, terminal contact pads 35, traces 38, terminal PCB contact ends 54 and cable contact ends 24 are schematically shown. In the embodiment of FIG. 3, a plurality of cable contact ends 24*a*, 24*b*, 24*c*, 24*d*, 24*c*, 24*f* is shown, and each cable contact end 24*a*-24*f* is disposed at a different location as measured along the Y axis. A plurality of cable contact pads 32*a*, 32*b*, 32*c*, 32*d*, 32*e*, 32*f* is also shown, and each cable contact pad 32*a*-32*f* is disposed at a different location on the PCB 28 as measured along the Y axis. A plurality of traces 38*a*, 38*b*, 38*c*, 38*d*, 38*c*, 38*f* is also shown. Further, a plurality of terminal contact pads 35*a*, 35*b*, 35*c*, 35*d*, 35*e*, 35*f* is shown, and each terminal contact pad 35*a*-35*f* is disposed at a different location on the PCB 28 as measured along the Y axis. Finally, a plurality of terminal PCB contact ends 54*a*, 54*b*, 54*c*, 54*d*, 54*c*, 54*f* is shown, and each terminal PCB contact end 54*a*-54*f* is disposed at a different location as measured along the Y axis.

In some embodiments, trace 38*a* electrically connects cable contact pad 32*a* and terminal contact pad 35*a*. In some embodiments, trace 38*b* electrically connects cable contact pad 32*b* and terminal contact pad 35*b*. In some embodiments, trace 38*c* electrically connects cable contact pad 32*c* and terminal contact pad 35*c*. In some embodiments, trace 38*d* electrically connects cable contact pad 32*d* and terminal contact pad 35*d*. In some embodiments, trace 38*c* electrically connects cable contact pad 32*e* and terminal contact pad 35*e*. In some embodiments, trace 38*f* electrically connects cable contact pad 32*f* and terminal contact pad 35*f*.

In some examples, a given cable contact pad 32*a* and a given terminal contact pad 35*a*, (which are electrically connected by trace 38*a*) are each disposed at the same, or substantially the same, position as measured along the Y axis. In some examples, a given cable contact pad 32*e* and a given terminal contact pad 35*e*, (which are electrically connected by trace 38*e*) are each disposed at different positions as measured along the Y axis. In some examples, a given cable contact pad 32*f* and a given terminal contact pad 35*f*, (which are electrically connected by trace 38*f*) are each disposed at different positions as measured along the Y axis.

Accordingly, as can be best seen in FIG. 3, one or more cable contact pads (such as the left-most cable contact pads 32*a*-32*c* in FIG. 3) can be connected via traces (38*a*-38*c*) to one or more respective terminal contact pads (such as the left-most terminal contact pads 35*a*-35*c* in FIG. 3), and each cable contact pad 32*a*-32*c* and each respective connected terminal contact pad 35*a*-35*c* can be disposed at the same (or substantially the same) position as measured along the Y axis. Further, as can be seen in FIG. 3, one or more cable contact pads (such as the right-most cable contact pads 32*d*-32*f* in FIG. 3) can be connected via traces (38*d*-38*f*) to one or more respective terminal contact pads (such as the right-most terminal contact pads 35*d*-35*f* in FIG. 3), and each cable contact pad 32*d*-32*f* and each respective connected terminal contact pad 35*d*-35*f* can be disposed at different positions as measured along the Y axis.

In some embodiments, some or all of the cable contact pads 32*a*-32*f* can be disposed in a row parallel to the Y axis. In some embodiments, some or all of the terminal contact pads 35*a*-35*f* can be disposed in a row parallel to the Y axis. Further, spacing of exemplary cable contact pads 32*a*-32*f* can differ among pairs of adjacent cable contact pads. For example, a distance between cable contact pads 32*a* and 32*b* can be different than a distance between cable contact pads 32*b* and 32*c*. Similarly, spacing of exemplary terminal contact pads 35*a*-35*f* can differ among pairs of adjacent terminal contact pads. For example, a distance between terminal contact pads 35*a* and 35*b* can be different than a distance between terminal contact pads 35*b* and 35*c*. It is also to be understood that the various cables 20*a*-20*f* can represent signal-carrying cables 20, drain wire cables 20, or any other type of electrically-conductive cable known to those skilled in the art.

In some embodiments, the PCB 28, cable contact pads 32*a*-32*f*, terminal contact pads 35*a*-35*f*, and/or traces 38*a*-38*f* can be custom-made for the cable assembly 10 application. In some embodiments, the PCB 28, cable contact pads 32*a*-32*f*, terminal contact pads 35*a*-35*f*, and/or traces 38*a*-38*f* can be dynamically configurable, electrically and/or mechanically, to thus allow multiple and/or configurable arrangements of the cable contact pads 32*a*-32*f*, terminal contact pads 35*a*-35*f*, and/or traces 38*a*-38*f* on the PCB 28 for increased flexibility and potentially real-time reconfigurability.

Figure 4:
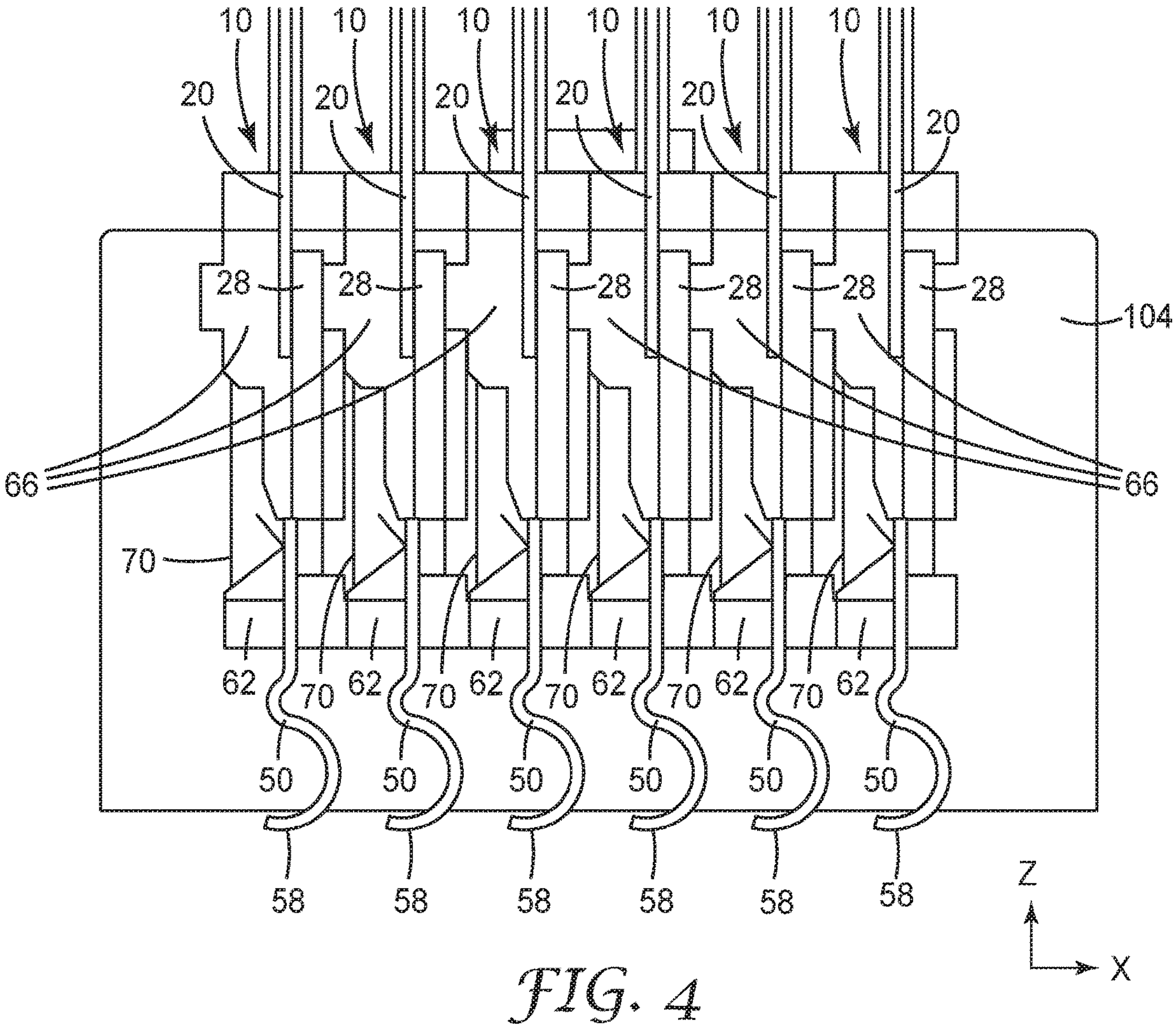
FIG. 4 is a sectional elevation view of a plurality of cable assemblies and an overmold body, according to exemplary embodiments of the present disclosure.
Figure 5:
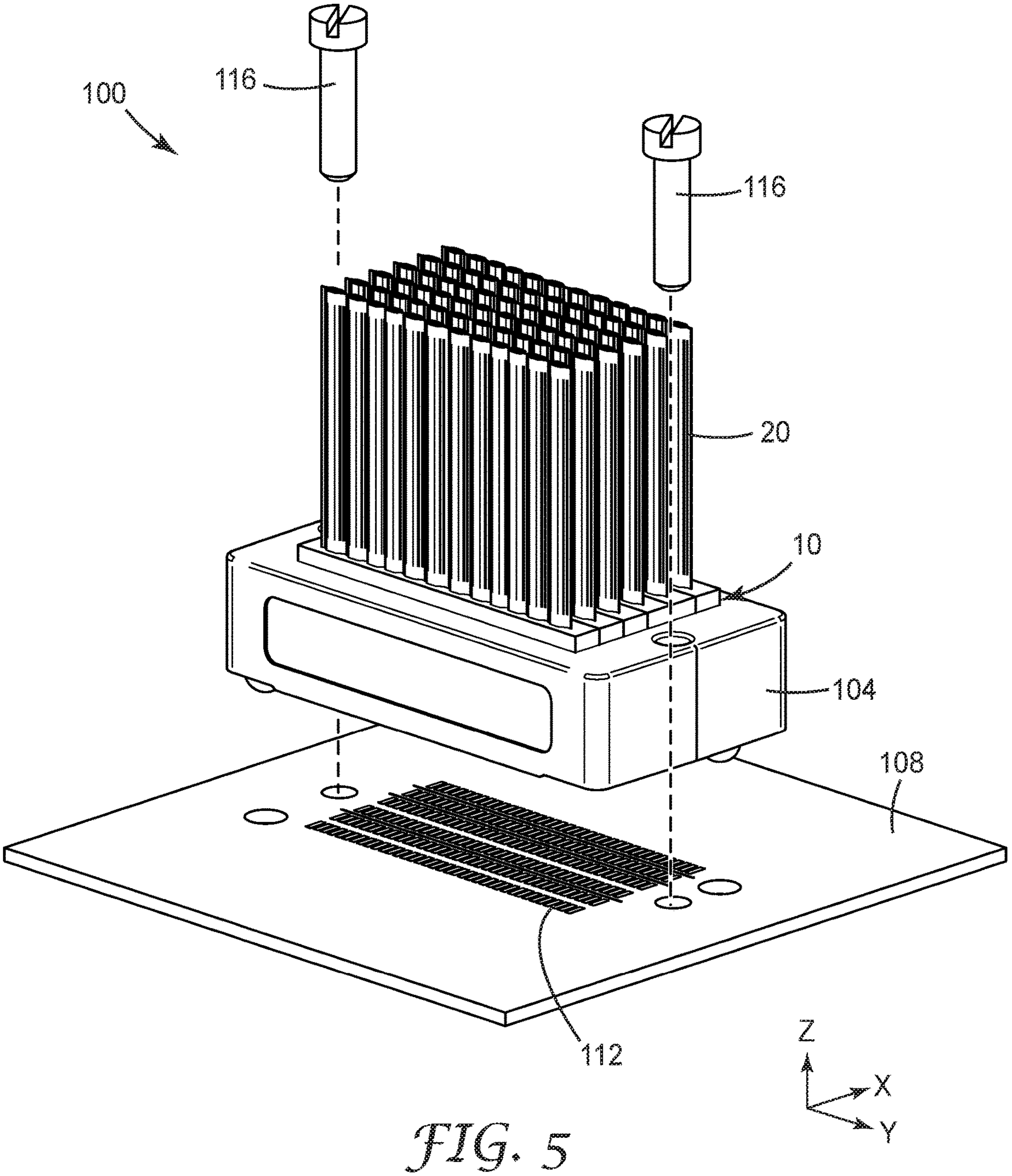
FIG. 5 is an exploded perspective view of a connector system according to exemplary embodiments of the present disclosure.
Figure 6:
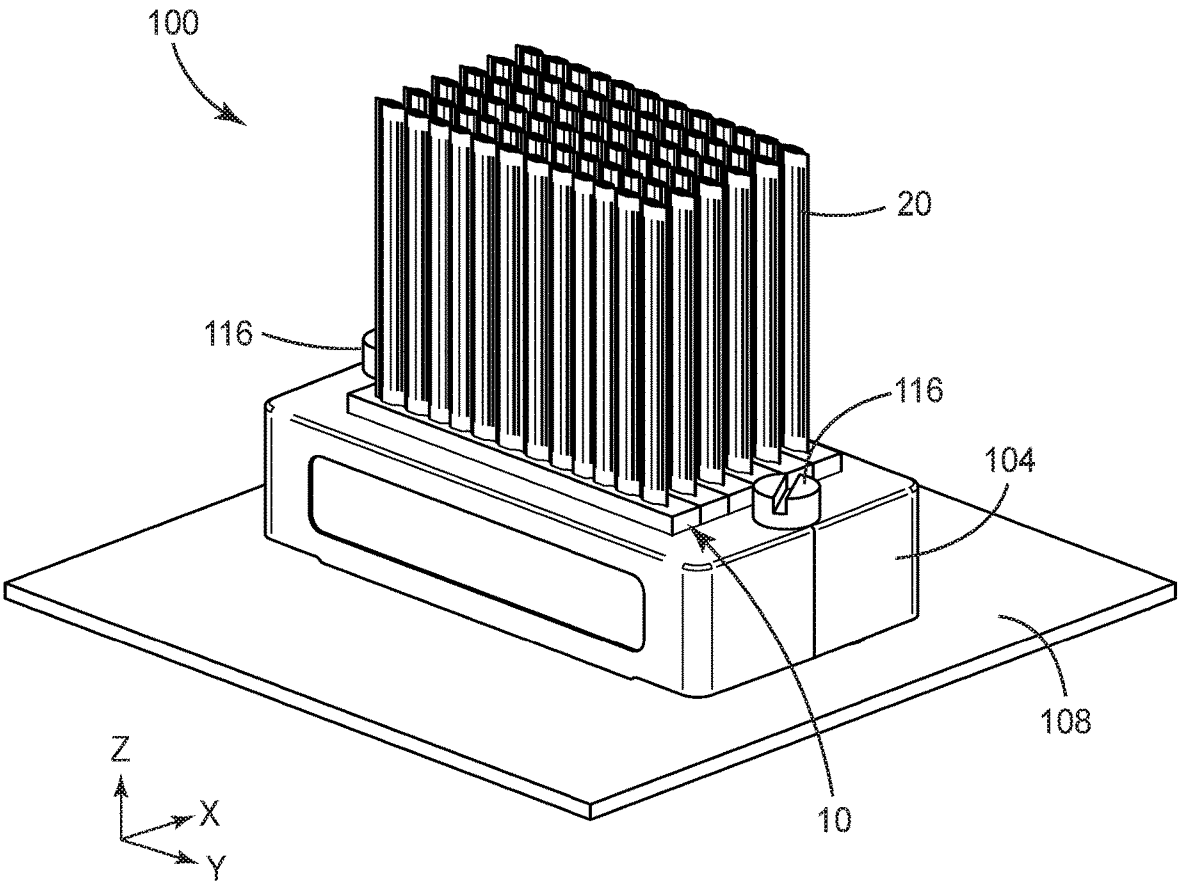
FIG. 6 is a perspective view of a connector system according to exemplary embodiments of the present disclosure.

FIG. 4 is an elevation view of a plurality of cable assemblies and an overmold body according to exemplary embodiments of the present disclosure, FIG. 5 is an exploded perspective view of a connector system according to exemplary embodiments of the present disclosure and FIG. 6 is a perspective view of a connector system according to exemplary embodiments of the present disclosure. Further, FIG. 7 is a schematic view of a terminal 50, including a terminal base circuit board contact end 58, making solderless electrical contact with a base circuit board contact 112 according to exemplary embodiments of the present disclosure.

Turning first to FIG. 4, the plurality of cable assemblies 10 can be seen. Each cable assembly 10 can include a cable 10, PCB 28, terminal 50, terminal base circuit board contact end 58, first frame 62, second frame 66, and ground plate 70. It is further noted that a ground plate 70 can be disposed between each adjacent pair of cable assemblies 10, and the ground plates 70 can serve to provide a grounding shield against electrical noise between adjacent cable assemblies 10 and components thereof. Accordingly, the ground plates 70 can be made of any material (such as stainless steel or another metal) known to those skilled in the art that provides such a shielding function. The cable assemblies 10 can also be disposed at least partially within an overmold body 104. The overmold body 104 can serve to protect, align and/or provide structural support for the cable assemblies 10 disposed therein. Further, in some embodiments, portions of the terminal 50 (such as the terminal base circuit board contact end 58) can extend below a lower portion of the overmold body 104, as measured along the Z axis.

Turning now to FIGS. 5 and 6, the connector system 100 can include one or more cable assemblies 10, the overmold body 104, a base circuit board 108, base circuit board contacts 112, and a fastener 116. In addition to protecting and aligning the cable assemblies, the overmold body 104 can also secure to the base circuit board 108 via one or more fasteners 116. The fastener 116 can include any magnetic, chemical, adhesive or mechanical connection technology known to those skilled in the art, such as bolts, clips, screws, clamps, hook-and-loop panels, welding and interference fits. FIG. 5 shows the overmold body 104 and cable assemblies 10, fasteners 116, and base circuit board 108 in an exploded, or separated, state, while FIG. 6 shows these elements in an operational and joined state. In the embodiment shown in the figures, the fasteners 116 can be bolts or screws that fit into corresponding features in the base circuit board 108 as can be clearly understood by one skilled in the art.

Figure 7:
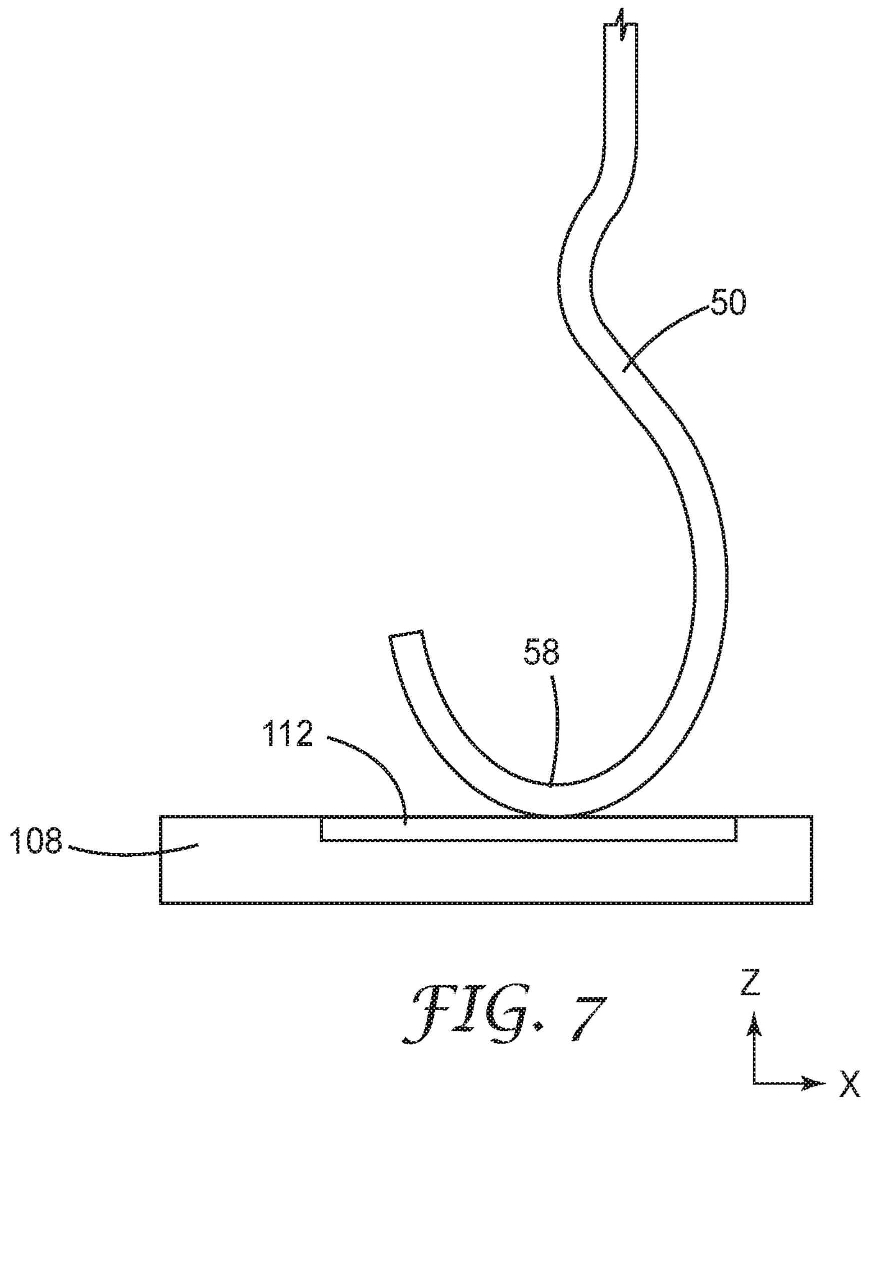
FIG. 7 is a schematic view of a terminal, including a terminal base circuit board contact end, making solderless electrical contact with a base circuit board contact according to exemplary embodiments of the present disclosure.

FIG. 7 is a schematic view of a terminal 50, including a terminal base circuit board contact end 58, making electrical contact with a base circuit board contact 112, according to exemplary embodiments of the present disclosure. In some embodiments, the terminal 50 can be welded or soldered to the base circuit board contacts 112 to ensure an electrical communication path therebetween. In some embodiments, a solderless contact is formed between the terminal base circuit board contact end 58 and the base circuit board contact 112. Such a solderless contact can be enhanced by the terminal 50 (or another element of the cable assembly 10 or connector system 100) incorporating a mechanical or elastic structure or design that biases the terminal base circuit board contact end 58 toward the base circuit board contact 112 when these two elements (58, 112) are in contact with each other. In some embodiments, the base circuit board 108 is disposed below, as measured along the Z axis, the cable assembly 10, or any constituent element thereof.

It is to be understood that any of the above-described elements (10, 24, 28, 32, 35, 38, 50, 54, 58, 62, 66, 70, 100, 104, 108, 112, 116) can include any material commonly known to those skilled in the art including, but not limited to, electrically-conductive materials, non-conductive materials, substantially non-conductive materials, metals (such as gold, silver, copper, iron and aluminum), metal alloys, polymers, composite materials, carbon, non-metals (such as silicon) and organic materials. Further, any of the above-described elements (10, 24, 28, 32, 35, 38, 50, 54, 58, 62, 66, 70, 100, 104, 108, 112, 116) can be manufactured using any technology known in the art such as casting, molding, machining, forging, stamping, press-fitting, etching, vapor-depositing, welding, laminating, soldering and adhering.

The disclosed embodiments provide numerous benefits and mechanisms for the flexible, secure, and stable operation of a connector system 100 and cable assembly 10. In particular, the arrangements described regarding the PCB 28, and placements of the cable contact pads 32*a*-32*f*, traces 38*a*-38*f*, and terminal contact pads 35*a*-35*f* thereon, case manufacturing requirements and part interoperability.

As detailed above, when a given cable contact pad is connected via a trace to a given terminal contact pad, the cable contact pad and the terminal contact pad can be at the same position or a different position on the PCB as measured along the Y axis. Further, among multiple cable contact pads connected via traces to respective terminal contact pads, any number of connected cable contact pad and terminal contact pad pairs can be at the same (or substantially the same) position as measured along the Y axis and any number of connected cable contact pad and terminal contact pad pairs can be at different positions as measured along the Y axis. This flexibility enables an easy electrical connection to be made between individual cables and individual terminals regardless of a pitch, or spacing along the Y axis, between individual cables or between a pitch, or spacing along the Y axis, between individual terminals. For example, if the pitch of cables (whether irregular, constant, or incorporating a repeating pattern) is different from that of the terminals, it would be impossible to make a cable assembly as described using conventional connection means. However, in the present case, such differences in pitch between the cables and terminals can be easily accommodated for by altering the spacing of the terminal contact pads and the cable contact pads on the PCB. Thus, a much wider range of terminals and cables can be accommodated in a cable assembly due to the flexibility provided by the PCB and the included cable contact pads and terminal contact pads. Additional benefits of such a system, along with other related disclosure and information, can be found in WO Publication 2018/060922, published on Apr. 5, 2018, incorporated herein by reference (which is associated with Filing Number PCT/IB2017/055968, filed Sep. 28, 2017, incorporated herein by reference).

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of these embodiments will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated. In various embodiments, the terms "about" and "substantially" and the like can indicate a variance of +/−10 percent, +/−5%, or +/−1%.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure. The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control.

The invention claimed is:

1. A cable assembly, comprising:

a plurality of cables;

a cable contact end defined at one end of each of the cables;

a plurality of terminals;

a terminal PCB contact end defined at one end of each of the terminals;

a terminal base circuit board contact end defined at an opposite end of each of the terminals;

a printed circuit board (PCB);

a plurality of cable contact pads defined on the PCB; and a plurality of terminal contact pads defined on the PCB, wherein a first terminal contact pad of the plurality of terminal contact pads and a first cable contact pad of the plurality of cable contact pads are in electrical communication with one another and a second terminal contact pad of the plurality of terminal contact pads and a second cable contact pad of the plurality of cable contact pads are in electrical communication with one another, wherein a first cable contact end of the plurality of cable contact ends is in electrical communication with the first cable contact pad and a second cable contact end of the plurality of cable contact ends is in electrical communication with the second cable contact pad, wherein a first terminal PCB contact end of the plurality of terminal PCB contact ends is in electrical communication with the first terminal contact pad and a second terminal PCB contact end of the plurality of terminal PCB contact ends is in electrical communication with the second terminal contact pad, and wherein the first cable contact pad and the first terminal contact pad are disposed at different locations on the PCB, as measured along a Y axis, and the second cable contact pad and the second terminal contact pad are disposed at different locations on the PCB, as measured along the Y axis;

and wherein each terminal base circuit board contact end is configured to make solderless electrical contact with a respective base circuit board contact of a base circuit board when the cable assembly is mounted to the base circuit board, the base circuit board being disposed below, as measured along a Z axis, the cable assembly.

2. The cable assembly of claim 1, wherein each terminal of the plurality of terminals makes solderless contact with a base circuit board contact.

3. The cable assembly of claim 2, wherein the base circuit board contacts are disposed on a base circuit board, and the base circuit board is disposed below, as measured along a Z axis, the cable assembly.

4. The cable assembly of claim 1, wherein the first terminal contact pad and the first cable contact pad are in electrical communication via a first trace and wherein the second terminal contact pad and the second cable contact pad are in electrical communication via a second trace.

5. The cable assembly of claim 1, wherein the PCB includes one or more materials selected from the group consisting of silicon, gold, copper, and carbon.

6. The cable assembly of claim 1, wherein the PCB, the cable contact ends, and the terminal PCB contact ends are at least partially surrounded by an overmold.

7. The cable assembly of claim 1, wherein the cable assembly includes a ground plate disposed proximate the PCB.

8. A cable assembly, comprising:

a cable;

a cable contact end defined at one end of the cable;

a terminal;

a terminal PCB contact end defined at one end of the terminal;

a terminal base circuit board contact end defined at an opposite end of the terminal;

a printed circuit board (PCB);

a cable contact pad defined on the PCB; and a terminal contact pad defined on the PCB, the terminal contact pad and the cable contact pad being in electrical communication with one another, the cable contact end is in electrical communication with the cable contact pad and the terminal PCB contact end is in electrical communication with the terminal contact pad;

wherein the terminal base circuit board contact end is configured to make solderless electrical contact with a base circuit board contact of a base circuit board when the cable assembly is mounted to the base circuit board;

wherein the terminal contact pad and the cable contact pad are disposed at different locations on the PCB, as measured along a Y axis.

9. The cable assembly of claim 8, wherein the terminal makes solderless contact with a base circuit board contact.

10. The cable assembly of claim 9, wherein the base circuit board contacts are disposed on a base circuit board, and the base circuit board is disposed below, as measured along a Z axis, the cable assembly.

11. The cable assembly of claim 8, wherein the first terminal contact pad and the first cable contact pad are in electrical communication via a first trace and wherein the second terminal contact pad and the second cable contact pad are in electrical communication via a second trace.

12. The cable assembly of claim 8, wherein the PCB includes one or more materials selected from the group consisting of silicon, gold, copper, and carbon.

13. The cable assembly of claim 8, wherein the PCB, the cable contact ends, and the terminal PCB contact ends are at least partially surrounded by an overmold.

* * * * *